No. 896,515. PATENTED AUG. 18, 1908.
A. B. CHAPMAN.
ANTIFRICTIONAL BEARING.
APPLICATION FILED SEPT. 12, 1907.
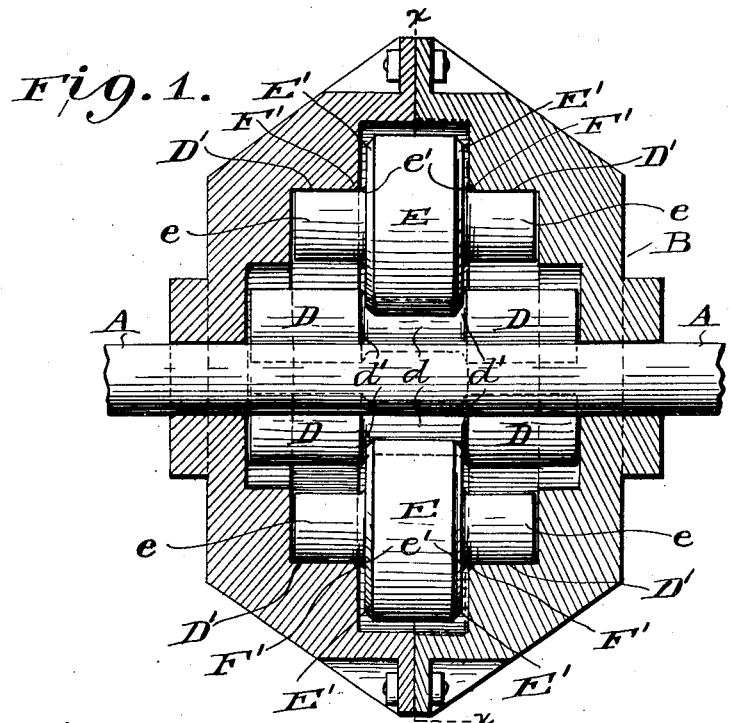
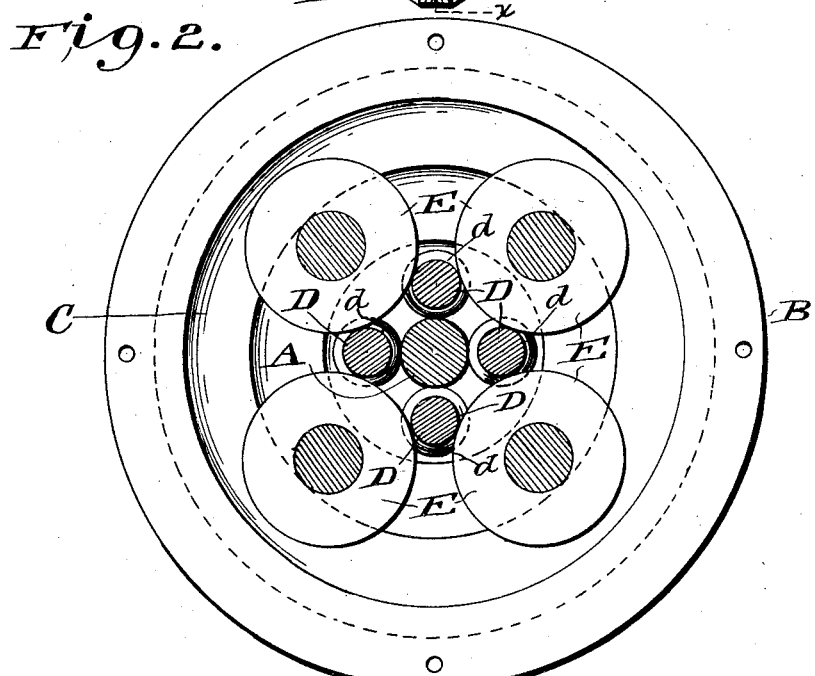
WITNESSES
INVENTOR

UNITED STATES PATENT OFFICE.

ABNER B. CHAPMAN, OF TAMPA, FLORIDA, ASSIGNOR OF ONE-THIRD TO EUGENE L. HART, OF TAMPA, FLORIDA.

ANTIFRICTIONAL BEARING.

No. 896,515.   Specification of Letters Patent.   Patented Aug. 18, 1908.

Application filed September 12, 1907. Serial No. 392,583.

*To all whom it may concern:*

Be it known that I, ABNER B. CHAPMAN, a citizen of the United States, residing at Tampa, in the county of Hillsboro and State of Florida, have invented certain new and useful Improvements in Antifrictional Bearings, of which the following is a specification.

My invention relates to bearings for wheels, and journal boxes, and has for its objects the provision of a bearing consisting of two sets of rollers mounted in a chamber in the wheel, one set rotating on the axle and having depressions in the middle, while the other set bears against said depressed middle portions of the first named set of rollers and has trunnions extending from their ends that engage annular shoulders on the interior of the wheel.

The construction and advantages of my improved bearing will be described hereinafter and illustrated in the accompanying drawings in which—

Figure 1 is a cross section of a vehicle wheel hub involving my invention and Fig. 2, a section on the line $x$—$x$ of Fig. 1.

In the drawings similar reference characters indicate corresponding parts in both views.

A indicates a shaft or axle on which is revolubly mounted the hub B which is preferably made in two parts as shown in Fig. 1 held together by any suitable means. The inside of the hub B is formed with a chamber C to receive the bearings consisting of the rollers D bearing on the shaft or axle A and the rollers E bearing in depressions $d$ in rollers D, said rollers E having trunnions $e$ projecting from their ends that engage shoulders D' on the inside of the hub B. The ends of the depressions $d$ are beveled as shown at $d'$ and the edges of the rollers E are correspondingly beveled as shown at E' to engage the beveled ends $d'$ of said depressions $d$, so as to prevent the ends of rollers E and sides of depressions $d$ from contacting. The inner ends of the trunnions $e$ where they join the rollers E are also beveled as shown at $e'$ to engage the beveled edge F' on the shoulders F this construction contributing to prevent friction between the ends of the rollers E and the sides of the chamber C.

It will be understood from the above description and an inspection of the drawings that the hub B is carried on the trunnions $e$ of rollers E and that the rollers E bear on rollers D which in turn engage the shaft or axle A. The rollers D and E mutually contribute to space each other apart so that there is no rubbing friction between the surfaces of the sets of rollers while the beveled portions at the points adjacent to the upright surfaces prevent said upright surfaces engaging each other so that all parts are free to travel on their bearings without rubbing contact therewith or adjoining surfaces.

I have shown my device applied to the hub of a wagon wheel but it will be understood that it is equally applicable to other forms of wheel by altering the construction of the wheel without materially changing the construction of the bearings as above described. Said changes being within the province of a skilled mechanic and thought to be unnecessary to be illustrated.

Having thus described my invention what I claim is—

1. A roller bearing comprising the combination with a shaft or axle, and a bearing box having a chamber therein, of two concentric groups of bearing rollers contained in said chamber, one of said groups traveling on the shaft or axle and having an annular depression intermediate of its ends, and the other set of rollers riding in said depressions and having trunnions to engage the interior wall of said chamber, substantially as shown and described.

2. A roller bearing comprising the combination with a shaft or axle, and a bearing box having a chamber therein with annular shoulders, of two concentric groups of bearing rollers contained in said chamber, one of said groups traveling on the shaft or axle and consisting of rollers having annular recesses therein intermediate of their ends, the surface of the rollers adjacent to said recesses being beveled, the other group of rollers riding in the recesses in the first mentioned group of rollers and having beveled edges to engage the beveled portions of the other group of rollers, the rollers in the last mentioned group having trunnions extending from their ends to engage the annular shoulders aforesaid, and the edges of the shoulders and the last mentioned rollers adjacent to the trunnions being correspondingly beveled, substantially as shown and described.

In testimony whereof I hereto affix my signature in the presence of two witnesses.

ABNER B. CHAPMAN.

Witnesses:
A. F. WILSON,
WADE H. HOWARD.